United States Patent
Sonderegger et al.

(10) Patent No.: US 7,373,827 B2
(45) Date of Patent: May 20, 2008

(54) HIGH-PRESSURE SENSOR WITH SEALING SYSTEM

(75) Inventors: Christof Sonderegger, Neftenbach (CH); Paul Engeler, Frauenfeld (CH); Peter Charles Tack, Getzville, NY (US); Andrew Crawford, Tonawanda, NY (US)

(73) Assignee: Kistler Holding AG, Winterthur (CH)

( * ) Notice: Subject to any disclaimer, the term of this patent is extended or adjusted under 35 U.S.C. 154(b) by 0 days.

(21) Appl. No.: 11/689,842

(22) Filed: Mar. 22, 2007

(65) Prior Publication Data

US 2008/0028862 A1 Feb. 7, 2008

Related U.S. Application Data

(60) Provisional application No. 60/821,630, filed on Aug. 7, 2006.

(51) Int. Cl.
*G01L 7/00* (2006.01)
(52) U.S. Cl. .......................................... 73/706; 73/700
(58) Field of Classification Search ................. 73/700, 73/706
See application file for complete search history.

(56) References Cited

U.S. PATENT DOCUMENTS

| | | | | |
|---|---|---|---|---|
| 6,484,585 | B1 * | 11/2002 | Sittler et al. | 73/718 |
| 7,028,549 | B2 * | 4/2006 | Wingsch | 73/715 |
| 2004/0035210 | A1 * | 2/2004 | Wingsch | 73/700 |
| 2006/0278002 | A1 * | 12/2006 | Henn et al. | 73/706 |
| 2007/0186661 | A1 * | 8/2007 | Ricks | 73/715 |

* cited by examiner

*Primary Examiner*—Andre J Allen
(74) *Attorney, Agent, or Firm*—Dority & Manning, P.A.

(57) ABSTRACT

A high-pressure sensor comprises an inner part, a housing and a sealing system located between the inner part and the housing for sealing the high-pressure sensor. The inner part has a shaft having an end face resting, by means of a clamping force, at least along a sealing line on a support surface at a projection on the housing. Each of the projection and the shaft has an inner surface and an outer surface. The support surface is arranged in an acute angle with respect to the inner surface of the projection. The shaft by means of the clamping force is supported on the housing along a support line whereby the sealing effect can be increased with increasing pressure.

17 Claims, 5 Drawing Sheets

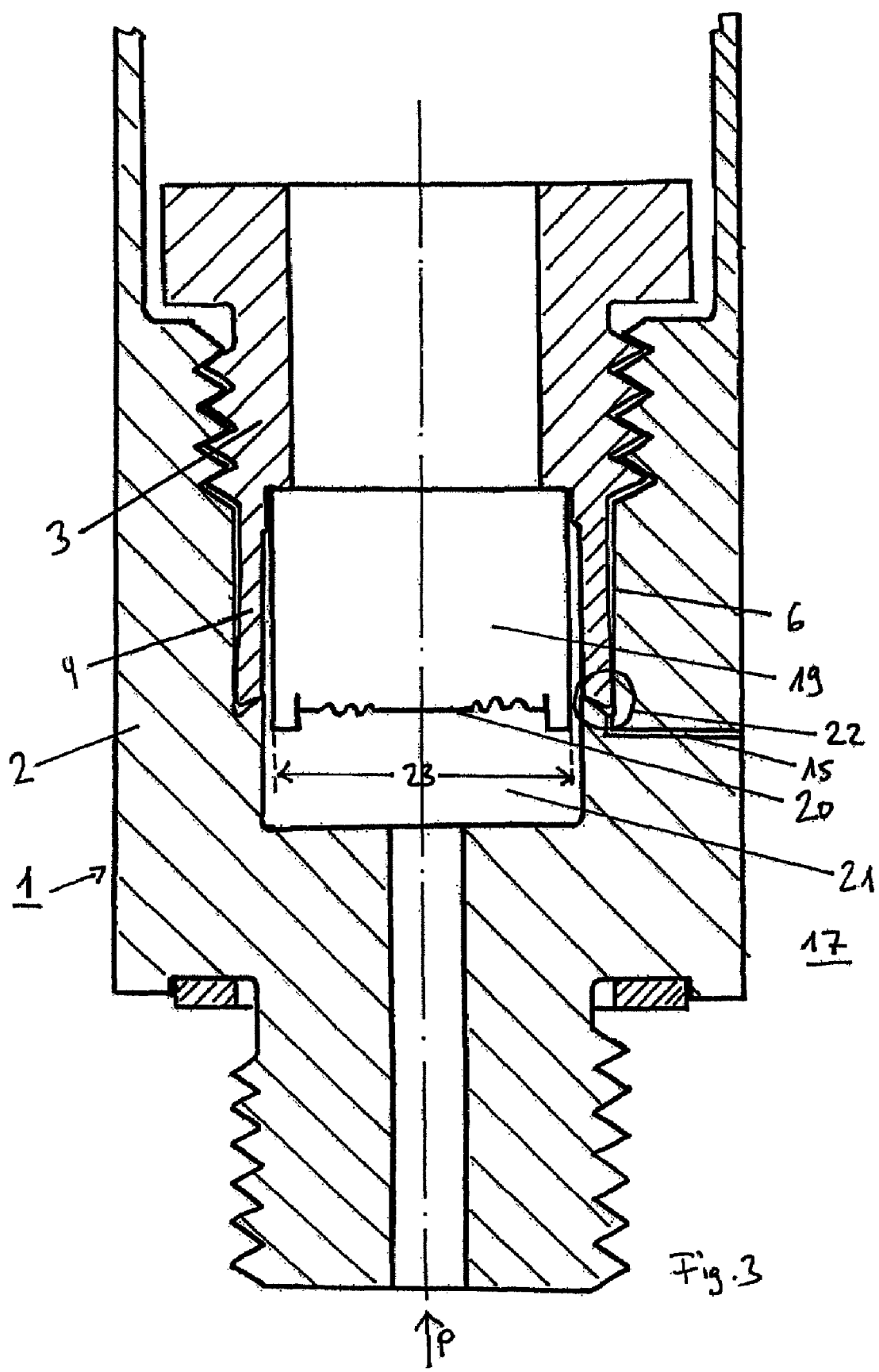

US 7,373,827 B2

HIGH-PRESSURE SENSOR WITH SEALING SYSTEM

CROSS-REFERENCE TO RELATED APPLICATIONS

This application claims priority to commonly owned U.S. Provisional Application Ser. No. 60/821,630, filed Aug. 7, 2006.

TECHNICAL FIELD

The invention relates to a high-pressure sensor enclosing an inner part, a housing as well as a sealing system arranged between those two components for sealing the high-pressure sensor.

BACKGROUND

High-pressure sensors require a reliable sealing system to avoid leakage of liquid or gases which are subject to the high pressures to be measured.

Known systems form for example a conical sealing between a housing and a shaft of an inner part by means of a clamping force provided between these parts. FIG. 1 shows a schematic perspective view of a conical sealing according to the prior art. The arrow P denotes the respective pressure arising during a measurement. Within a housing 2 there is shown an inner part 3 engaging therewith and braced therewith by means of a thread which has an outwardly facing cone. This cone relies on a corresponding opposite cone at the housing 2 thereby forming a sealing portion 8. The high plastic deformation at this sealing portion, however, has been found to be disadvantageous. Furthermore, high wear at the sealing portion has been detected due to a displacement of these components relative to each other which arises because the cone of the inner part is markedly softer than the housing. Since the cone at the inner part 3 is clearly more elastic than the housing 2 a relative movement between the components mentioned may occur resulting in wear and eventually in leakiness of the sealing portion 8.

Another solution provides an intermediate part which is clamped between the housing and the inner part. FIG. 2 shows another sealing system according to the prior art. This system has an intermediate part 18 between an inner part 3 and a housing 2. This assembly, however, is not feasible for large diameters. Moreover, it lacks a self-amplifying effect.

O-Rings have the disadvantage of being not medium-compatible in the case of pressure media such as hydraulic oils or kerosene, corrosive gases or other pressurized materials.

BRIEF SUMMARY AND OBJECTS OF THE INVENTION

It is an object of the present invention to provide a high-pressure sensor with a sealing system between a housing and an inner part of the high-pressure sensor which sealing system exerts a self-amplifying effect, i.e. the higher the pressure, the more impervious the sealing gets. Furthermore, said components should not be able to move relative to each other under pressure.

This object has been achieved by the features of the independent claim.

The idea underlying the invention is that the sealing system of the high-pressure sensor according to the invention is a conical sealing arranged in an inwardly facing, i.e. engaging in an acute-angled manner between a projection within the housing and a shaft of the inner part. Due to the clamping force applied between the housing and the inner part the outer rim portion of the shaft is forced to and rests on the housing. In this way the sealing effect increases with increasing pressure.

Further preferred embodiments can be seen from the dependent claims.

The particular advantage of this system according to the invention is that by means of the above-mentioned bracing between the housing and the inner part a uniformly distributed rigidity is achieved in this area ensuring that no relative movements can occur.

Other favorable properties are the small tension changes in the case of cyclic strain leading to a longer service life.

BRIEF DESCRIPTION OF THE DRAWINGS

In the following the invention is explained in more detail by referring to the drawings. The Figures show:

FIG. 3 a schematic sectional representation of a high-pressure sensor according to the present invention;

DETAILED DESCRIPTION OF EMBODIMENTS OF THE INVENTION

Figure 1:
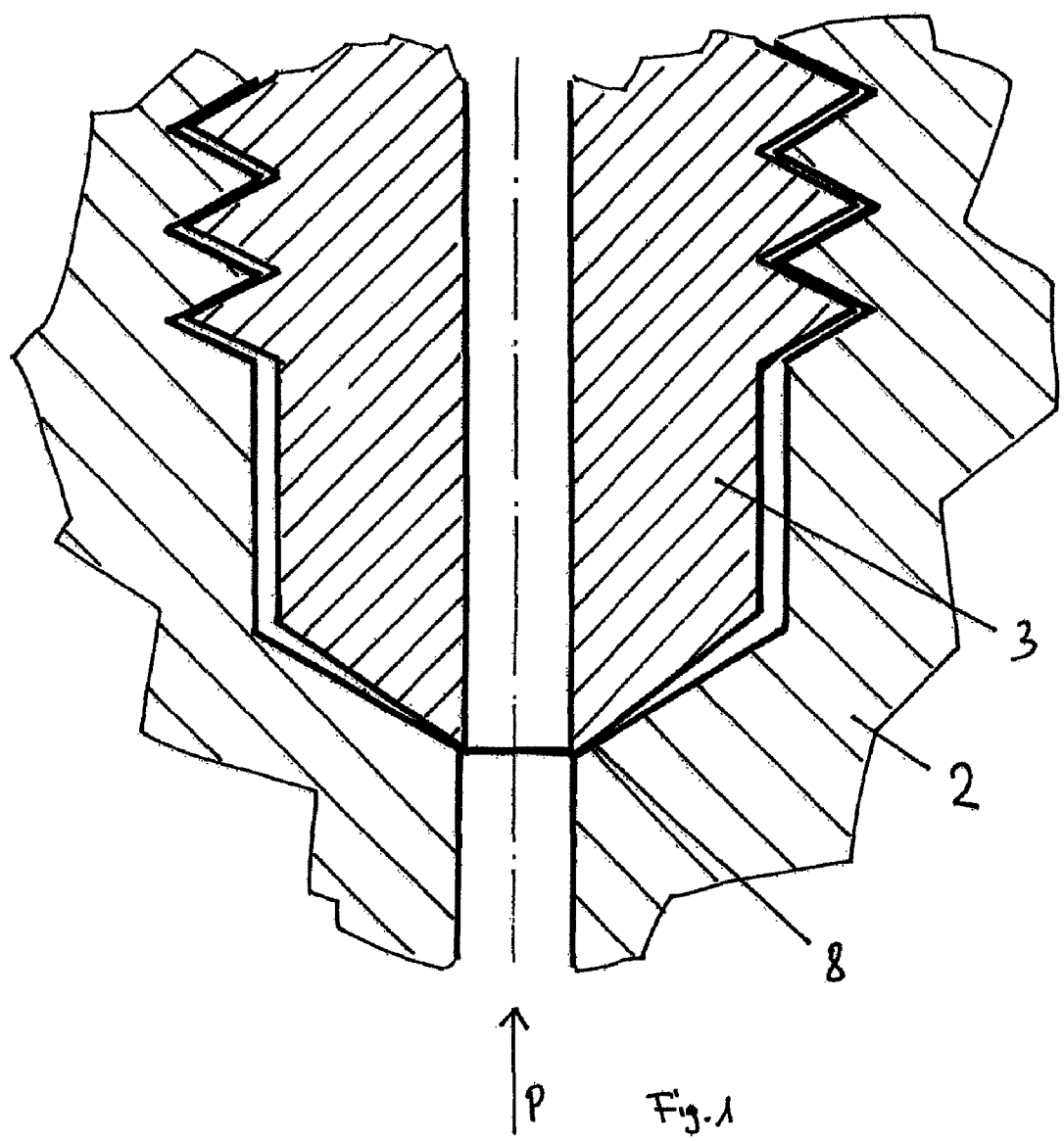
FIG. 1 a schematic sectional representation of a sealing system according to the prior art.
Figure 2:
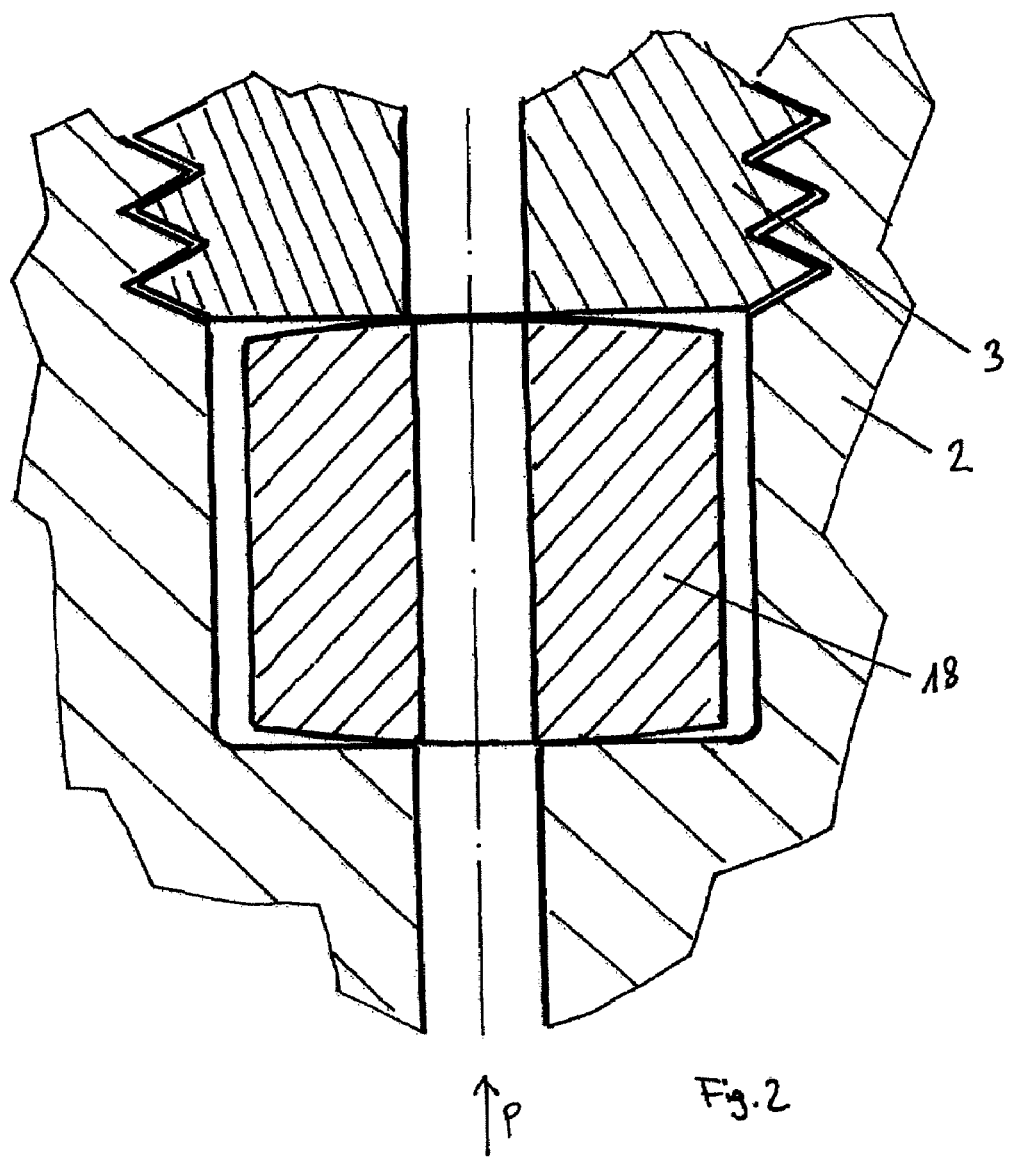
FIG. 2 another schematic sectional representation of a sealing system according to the prior art.

FIG. 3 shows a high-pressure sensor 1 according to the invention. It comprises a housing 2 as well as an inner part 3 attached by means of a shaft 4 to a projection 6 at the housing 2 under an applied clamping force. In this example the clamping force has been achieved by means of a thread. Other possibilities comprise welding the housing 2 to the inner part 3. The interior 19 of the inner part 3 may accommodate a sensor element sealed against the pressure chamber 21 by a membrane 20.

The invention describes a high-pressure sensor 1 with a sealing system which is a conical sealing arranged in an inwardly facing, i.e. engaging in an acute-angled manner between a projection 6 within the housing 2 and a shaft 4 of an inner part 3 of the high-pressure sensor 1. By means of a clamping force applied between the housing 2 and the inner part 3 the outer rim portion of the shaft 4 is forced to and rests on the housing 2. In this way the sealing effect increases with increasing pressure.

Figure 4A:
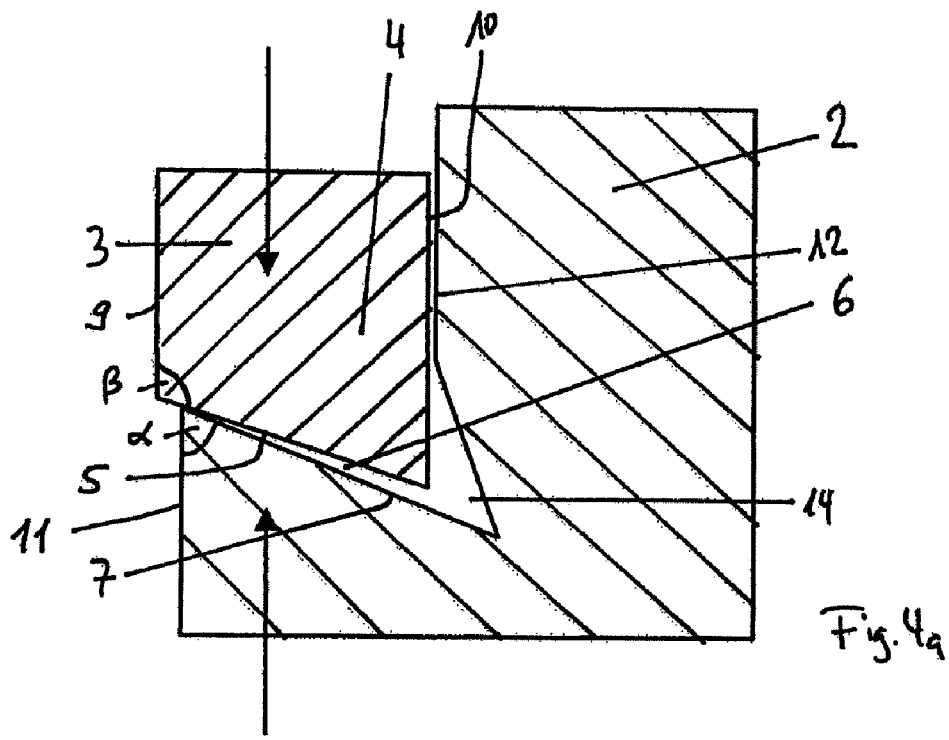
FIG. 4 a detailed cross-sectional representation of a sealing system of the high-pressure sensor according to the present invention
 a) in an unbraced state, and
 b) in a braced state.

The sealing area 22 of the high-pressure sensor 1 according to the invention is shown in more detail in FIG. 4. FIG. 4a represents the shaft 4 of the inner part 3 as well as the housing 2 with its projection 6 in an unbraced state. The shaft 4 has an end face 5 as well as an inner surface 9 and an outer surface 10. The housing 2 has a supporting surface 7 as well as an inner surface 11 and an outer surface 12.

In contrast to the prior art according to FIG. 1 the angles $\alpha$, $\beta$ of the conical sealing are oriented in different directions. In particular, the supporting surface 7 is arranged in an acute angle α with respect to the inner surface 11 of the projection. It may be contemplated to embody the end face 5 on the shaft 4 in a planar manner, perpendicularly to the direction of pressure. The end face 5, however, is preferably arranged in an obtuse angle β to the inner surface 9 of the shaft 4 as represented in this embodiment. Preferably, an open angle of about 1-2° remains between the end face 5 and the supporting surface 7. The acute angle α and the obtuse angle β mentioned above are together less than or equal to 180°. Preferably, the sum of these two angles α and β is between 170 and 180°.

According to the invention, the acute angle α of the projection should be between 45 and 70°, preferably between 60 and 70°. Accordingly, according to the invention the obtuse angle β of the shaft should be between 110 and 135°, preferably between 110° and 120°.

Figure 4B:
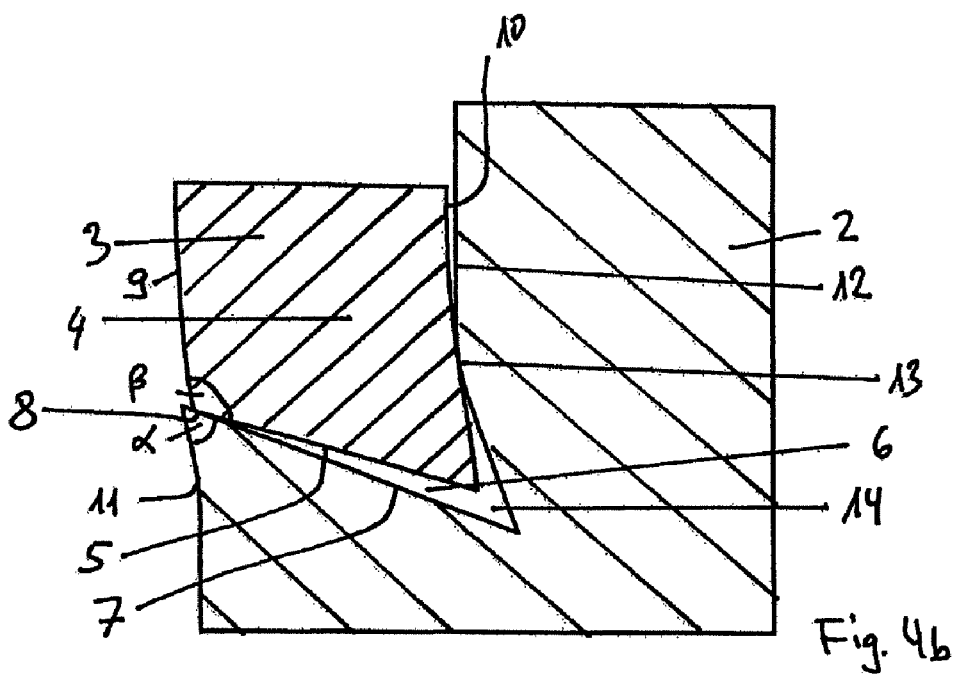

FIG. 4b shows the shaft 4 of the inner part 3 as well as the projection 6 of the housing 2 in a braced state. This bracing has been generated by a clamping force acting on the housing 2 and the inner part 3 as indicated by the arrows in FIG. 4a. Due to this clamping force, the end face 5 fits closely to the supporting surface 7 at least along a sealing line 8.

This clamping force results in deformations and distortions of individual regions of the housing 2 and the inner part 3. Thus, due to the mutual pressure the inner surface 11 of the projection is pushed in an inward direction, while simultaneously the end portion of the shaft 4 and in particular its inner surface 9 and outer surface 11 are pushed in an outward direction. According to the invention, the shaft 4 is now supported by the housing 2. Preferably, projection 6 is provided with an undercut 14 so that the outer surface of the shaft 10 is able to move somewhat into the region of the undercut 14. Thereby, a second contact is created between the housing 2 and the inner part 3 at the outer surface 12 of the projection near a region where the undercut 14 begins. Along this support line 13 the shaft 4 rests on the housing 2. Because it rests on the housing 2 the shaft 4 is firmly tightened within the projection 6. If a high pressure is applied to the sensor the shaft 4 is unable to move further to the outside and thereby increases the pressure onto this support line 13. Concomitantly, the pressure acts on the inner surface 11 of the projection thereby further increasing the sealing effect.

The support line 13 from the shaft 4 to the housing 2 can be embodied as a second sealing zone if all perimeters of both components 2, 3 lack notches in the area of the support line 13.

Figure 5A:
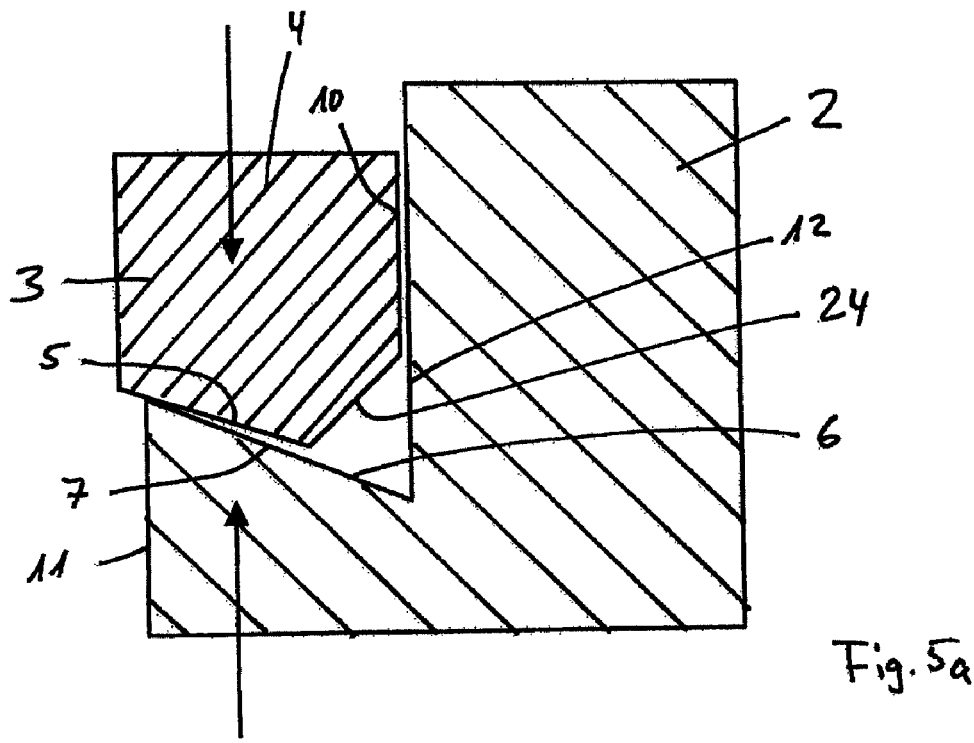
FIG. 5 a detailed cross-sectional representation of an alternative sealing system of the high-pressure sensor according to the present invention
 a) in an unbraced state, and
 b) in a braced state.
Figure 5B:
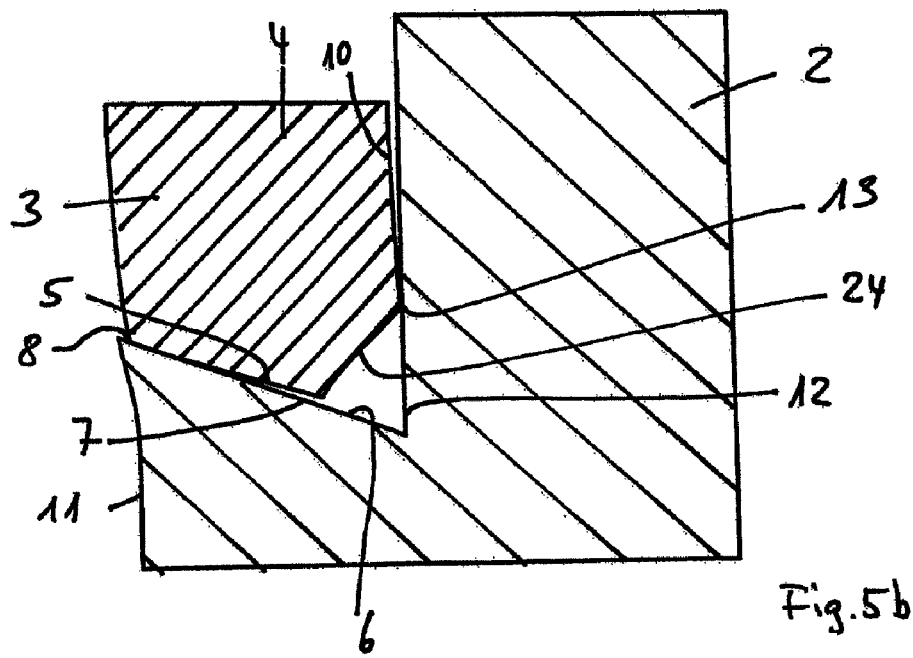

As an alternative solution to the undercut 14, the edge between the outer surface of the shaft 10 and the end face 5 of the shaft 4, as shown in FIG. 5, can be provided with a flattening 24. Both versions as shown in FIG. 4 and FIG. 5 result in the definition of the support line 13 as a second sealing zone when a pressure is applied. Due to the definition of this sealing zone as edge or line, a high pressure per surface is assured. By contrast, the pressure per surface of an undefined, two-dimensional shaped sealing zone would be lower and the thereby achieved sealing unsafe.

The undercut 14 and/or the flattening 24 serve different functions. Upon application of the clamping force the volume in the region between the two sealing zones is decreased, thus generating a pressure which counteracts the clamping force. The higher the volume the smaller is the pressure. Without an undercut 14 or a flattening 24 the volume is very small; namely it is limited by the angle opening of 180°-α-β between the support surface 7 and the end face 5 since in this case the support line 13 meets the corner of the outer end face 5. Secondly, the undercut 14 or a flattening 24 ensure further engagement of the shaft 4 with the housing 2 thereby increasing the tightening.

A ventilation channel 15 as shown in FIG. 3 can be provided in the area of the undercut 14 or a flattening 24 to the surrounding 17 in order to avoid the building up of pressure upon application of the clamping force. This ventilation channel 15 can extend directly across the housing 2. Alternatively, the shaft 4 or the projection 6 may have a notch along their outer surface 10 or 12, respectively, serving as a ventilation channel 15.

Since upon application of the clamping force the inner surfaces 9, 11 of shaft and projection are displaced relatively to each other they may be adapted accordingly. Advantageously in an unbraced state the inner surface 11 of the projection is positioned more to the outside than the inner surface 9 of the shaft. By the displacement described of the components upon application of the clamping force the two inner surfaces 9, 11 are pushed closer to each other.

On the other hand it may be advantageous that in an unbraced state the inner surface 11 of the projection is located more inside than the inner surface 9 of the shaft. By this it can be avoided that upon application of a clamping force the sharp edge between the support surface 7 and the inner surface 11 of the projection notches into the end face 5 of the inner part 3 thereby preventing the desired relative movement between end face and support surface.

An advantage of the above-mentioned sealing system is the uniform rigidity of the inner wall in the area of the sealing region 22 due to the fact that the shaft 4 rests on the housing 2. In the embodiment of the prior art according to FIG. 1 the shaft 4 of the inner part 3 is softer than the portion of the housing 2 onto which the pressure to be measured directly acts. This can be prevented by means of the support 13 in the embodiment according to the invention. Also, this does not create relative movements between the inner part 3 and the housing 2 thus decreasing the scuffing tendency along the contact line.

The direction of the seal surface 13 is in the direction the pressure to be measured affects the inner part 3 and/or the shaft 4. This provides a seal which increases with increasing pressure, but without providing extra load on the pressure capsule, thus providing good strain isolation for the pressure capsule from the external strains in the pressure containment housing.

Another particular embodiment relates to the materials of the housing 2 and the inner part 3. Preferably, these components should be composed of different materials or of materials of different hardness. This also reduces scuffing, in particular this prevents cold welding at the sealing line 7 and at the support line 13. Such cold welding is inconvenient particularly if the final clamping force or pre-tension has not yet been applied. Preferably, the inner part 3 is rather harder because this prevents the sharp edge between the support surface 7 and the inner surface 11 of the projection to notch into the end face 5 of the inner part 3 upon application of the clamping force which would prevent the desired relative movement between end face 5 and support surface 7.

According to the invention, a high-pressure sensor 1 is equipped with a sealing system of the above-mentioned type. Specifically for sensors having an inner diameter 23 of at least 10, preferably at least 15 mm such sealing systems are advantageous because conventional solutions often fail in the case of such big sensors. This is particularly true for oil-filled piezo-resistive high-pressure sensors provided with a silicon chip.

The invention claimed is:

1. A high-pressure sensor comprising an inner part, a housing as well as a sealing system located between the said inner part and housing for sealing the high-pressure sensor, wherein the inner part has a shaft having an end face resting, by means of a clamping force, at least along a sealing line on a support surface at a projection on the housing wherein each of the projection and the shaft has an inner surface and an outer surface wherein the support surface is arranged in an acute angle with respect to the inner surface of the projection, and the shaft by means of the clamping force is supported on the housing along a support line whereby the sealing effect can be increased with increasing pressure.

2. A high-pressure sensor according to claim 1 wherein the end face is arranged in an obtuse angle with respect to the inner surface of the shaft.

3. A high-pressure sensor according to claim 2 wherein the sum of said acute angle and said obtuse angle is one of less than 180° and equal to 180°.

4. A high-pressure sensor according to claim 1 wherein the sealing system comprises a second sealing zone in the area of the support line.

5. A high-pressure sensor according to claim 4 wherein the outer surface of the projection is provided with an undercut for defining the support line.

6. A high-pressure sensor according to claim 4 wherein the edge between the outer surface of the shaft and the end face of the shaft is provided with a flattening for defining the support line.

7. A high-pressure sensor according to claim 1 wherein a ventilation channel is disposed in the area between the sealing line and the support line.

8. A high-pressure sensor according to claim 1 wherein the inner surface of the projection is arranged more to the inside than the inner surface of the shaft.

9. A high-pressure sensor according to claim 1 wherein the inner surface of the projection is arranged more to the outside than the inner surface of the shaft.

10. A high-pressure sensor according to claim 1 wherein the acute angle between the support surface and the inner surface of the projection is between 45° and 70°.

11. A high-pressure sensor according to claim 1 wherein the obtuse angle between the end face and the outer surface of the shaft is between 110° and 135°.

12. A high-pressure sensor according to claim 1 wherein the direction of at least one seal surface is in the direction the pressure to be measured affects at least one of the inner part and the shaft.

13. A high-pressure sensor according to claim 1 wherein the housing and the inner part are made of materials of different hardness.

14. A high-pressure sensor according to claim 1 wherein the sensor has an inner diameter of at least 10 mm.

15. A high-pressure sensor according to claim 1 wherein the sensor is an oil-filled piezoresistive sensor provided with a silicon chip.

16. A high-pressure sensor according to claim 2, wherein the sum of the acute angle and the obtuse angle is between 170° and 180°.

17. A high-pressure sensor according to claim 1, wherein the sensor has an inner diameter of at least 15 mm.

* * * * *